(12) United States Patent
Hjerpe et al.

(10) Patent No.: US 11,491,360 B2
(45) Date of Patent: Nov. 8, 2022

(54) INFLATABLE STRUCTURE

(71) Applicant: Volvo Car Corporation, Gothenburg (SE)

(72) Inventors: Erik Hjerpe, Torslanda (SE); Nathan Nuzzo, Stockholm (SE)

(73) Assignee: Volvo Car Corporation, Gothenburg (SE)

( * ) Notice: Subject to any disclaimer, the term of this patent is extended or adjusted under 35 U.S.C. 154(b) by 269 days.

(21) Appl. No.: 16/827,790

(22) Filed: Mar. 24, 2020

(65) Prior Publication Data

US 2020/0306574 A1 Oct. 1, 2020

(30) Foreign Application Priority Data

Apr. 1, 2019 (EP) .................................... 19166583

(51) Int. Cl.
*A63B 5/11* (2006.01)
*B32B 7/09* (2019.01)
(Continued)

(52) U.S. Cl.
CPC ................ *A63B 5/11* (2013.01); *B32B 5/245* (2013.01); *B32B 7/09* (2019.01); *B32B 38/00* (2013.01);
(Continued)

(58) Field of Classification Search
CPC ... A63B 5/11; A63B 2225/62; A63B 2209/00; A63B 6/00; B32B 5/245; B32B 7/09;
(Continued)

(56) References Cited

U.S. PATENT DOCUMENTS

| 2,657,716 A | * | 11/1953 | Ford | ........................ D03D 1/02 |
| | | | | 296/107.1 |
| 4,462,331 A | * | 7/1984 | McCrory | .................. B63B 7/08 |
| | | | | 441/40 |

(Continued)

FOREIGN PATENT DOCUMENTS

| CN | 202409936 U | 9/2012 |
| CN | 103129509 A | 6/2013 |

(Continued)

OTHER PUBLICATIONS

Sep. 30, 2019 European Search Report Issued on International Application 19166583.

(Continued)

*Primary Examiner* — Garrett K Atkinson
(74) *Attorney, Agent, or Firm* — Clements Bernard Walker; Christopher L. Bernard

(57) ABSTRACT

The present disclosure relates to an inflatable structure transformable between a deflated state and an inflated state. The inflatable structure comprises a drop stitch fabric having a first layer and a second layer tethered by drop stitches. The inflatable structure is provided with, along at least a portion of an edge of the drop stitch fabric, an edge fixation line and an at least first inner fixation line at an at least first margin from the edge, the edge fixation line and the at least first inner fixation line comprising coupling means fixating the first layer to the second layer. The inflatable structure is further provided with, between the edge fixation line and the at least first inner fixation line, a non-inflatable connectable element e.g. adapted to be connectable with a detachably attachable counterpart element.

13 Claims, 8 Drawing Sheets

(51) Int. Cl.
  *B32B 5/24* (2006.01)
  *B32B 38/00* (2006.01)
(52) U.S. Cl.
  CPC ..... *A63B 2225/62* (2013.01); *B32B 2038/008* (2013.01)
(58) Field of Classification Search
  CPC ..... B32B 38/00; B32B 2038/008; B63B 7/08; F16B 13/063
  See application file for complete search history.

(56) References Cited

U.S. PATENT DOCUMENTS

| | | | | |
|---|---|---|---|---|
| 8,353,530 | B2* | 1/2013 | Czach | B60R 21/232 |
| | | | | 280/730.2 |
| 9,724,586 | B2* | 8/2017 | Smith | A63B 69/0093 |
| 10,045,647 | B2* | 8/2018 | Publicover | A63B 21/023 |
| 10,070,747 | B2* | 9/2018 | McMahan | B32B 7/06 |
| 10,208,502 | B2* | 2/2019 | Currid | E04H 15/06 |
| 10,335,694 | B2* | 7/2019 | Koide | A63G 31/007 |
| 10,913,518 | B2* | 2/2021 | Prade | B63B 73/46 |
| 11,040,237 | B2* | 6/2021 | Park | A63B 5/16 |
| 11,279,450 | B2* | 3/2022 | Sheerer | B63B 32/73 |
| 2008/0257137 | A1* | 10/2008 | James | F42D 5/045 |
| | | | | 102/303 |
| 2009/0078186 | A1* | 3/2009 | Rista | B63B 34/22 |
| | | | | 114/345 |
| 2010/0307629 | A1* | 12/2010 | Citterio | D03D 1/0041 |
| | | | | 139/116.1 |
| 2011/0287899 | A1 | 11/2011 | West | |
| 2012/0005836 | A1* | 1/2012 | Cik | B32B 7/12 |
| | | | | 5/737 |
| 2012/0011642 | A1* | 1/2012 | Dainese | B62J 27/20 |
| | | | | 2/455 |
| 2014/0251195 | A1* | 9/2014 | Excoffon | B63B 15/02 |
| | | | | 114/345 |
| 2015/0026878 | A1* | 1/2015 | Rambo | E04H 4/103 |
| | | | | 4/499 |
| 2016/0310792 | A1* | 10/2016 | Smith | A63B 69/0093 |
| 2017/0136368 | A1* | 5/2017 | Koide | B65D 90/0033 |
| 2017/0136372 | A1* | 5/2017 | Koide | A63G 31/007 |
| 2017/0136373 | A1* | 5/2017 | Vicente | A63G 31/007 |
| 2017/0172331 | A1* | 6/2017 | Publicover | B32B 7/022 |
| 2017/0273490 | A1* | 9/2017 | McMahan | B32B 5/245 |
| 2018/0208272 | A1* | 7/2018 | Hopkins | B32B 7/08 |
| 2018/0360250 | A1* | 12/2018 | Publicover | A63B 23/10 |
| 2019/0017287 | A1* | 1/2019 | Currid | E04H 15/06 |
| 2019/0046887 | A1* | 2/2019 | Vicente | A63G 31/007 |
| 2019/0336813 | A1* | 11/2019 | Park | A63B 5/16 |
| 2020/0221884 | A1* | 7/2020 | Ambuske | A47C 27/15 |
| 2020/0239113 | A1* | 7/2020 | Prade | B63B 32/53 |
| 2020/0407027 | A1* | 12/2020 | Sheerer | B63B 32/73 |
| 2021/0001960 | A1* | 1/2021 | Walpurgis | B63B 32/20 |
| 2021/0052936 | A1* | 2/2021 | Park | A63B 21/0085 |
| 2021/0060399 | A1* | 3/2021 | Dingel | A63B 67/06 |
| 2021/0121757 | A1* | 4/2021 | Cooper | A63B 67/06 |
| 2021/0178220 | A1* | 6/2021 | Carlisle | A63B 21/4037 |
| 2021/0331053 | A1* | 10/2021 | Zerby | A63B 67/06 |

FOREIGN PATENT DOCUMENTS

| | | |
|---|---|---|
| CN | 203063891 U | 7/2013 |
| CN | 103889791 A | 6/2014 |
| CN | 105579301 A | 5/2016 |
| CN | 107548285 A | 1/2018 |
| DE | 102017010812 A1 | 1/2019 |
| EP | 1114662 A2 | 7/2001 |
| EP | 3216497 A1 | 9/2017 |
| GB | 2502335 A | 11/2013 |
| JP | 2006525042 A | 11/2006 |
| JP | 2012158274 A | 8/2012 |

OTHER PUBLICATIONS

Second Office Action issued in corresponding Chinese Application No. 202010248883.3.

Jul. 13, 2021 European Search Report Issued on International Application 19166583.

* cited by examiner

INFLATABLE STRUCTURE

CROSS-REFERENCE TO RELATED APPLICATION

The present disclosure claims the benefit of priority of European Patent Application No. 19166583.5, filed on Apr. 1, 2019, and entitled "INFLATABLE STRUCTURE," the contents of which are incorporated in full by reference herein.

TECHNICAL FIELD

The present disclosure relates to an inflatable structure comprising a connectable element.

BACKGROUND

Products based on inflatable drop stitch technology are becoming increasingly popular, not the least since such products—e.g. kayaks, floats, gym mats etc.—when deflated, may be less bulky and hence more easily stored and/or transported, and further, be less heavy and/or less costly, than corresponding products of traditional material.

Commonly, an inflatable drop stitch may be e.g. a PVC-coated and/or laminated nylon and/or polyester fabric with layers joined by a dense array of e.g. vertical linear and/or zigzag fibers and/or polyester strands that are uniform in size. When the inflatable drop stitch then is adapted—e.g. glued and/or welded—into desired shape, and subsequently pressurized with air, it may be transformed into a strong, firm structure. The vertical fibers and/or strands—which may be referred to as the drop stitches—hold the air chamber firmly in shape, thus allowing the inflated structure to maintain its shape and stability under heavy outside pressure and impact.

Commonly, more complex inflatable drop stitch products consist of multiple drop stitch structures attached—e.g. glued—to one another. Moreover, the inflatable drop stitch products may additionally or alternatively consist of one or more multiple drop stitch structures attached—e.g. glued—to non-inflatable rigid structures, e.g. for improved rigidity and/or stability for, and/or fixation of, the inflatable drop stitch product in the inflated state thereof. Such multi-structure products may, however, cause complexity and/or weakness, require additional parts for coupling of structures, and further come at a high production cost.

SUMMARY

It is therefore an object of embodiments herein to provide an approach that overcomes or ameliorates at least one of the disadvantages of the prior art, or to provide a useful alternative.

The object above may be achieved by the subject matter disclosed herein. Embodiments are set forth in the appended dependent claims, in the following description and in the drawings.

The disclosed subject matter relates to an inflatable structure transformable between a deflated state and an inflated stat. The inflatable structure comprises a drop stitch fabric having a first layer and a second layer tethered by drop stitches. The inflatable structure is provided with, along at least a portion of an edge of the drop stitch fabric, an edge fixation line and an at least first inner fixation line at an at least first margin from the edge, the edge fixation line and the at least first inner fixation line comprising coupling means fixating the first layer to the second layer. The inflatable structure is, between the edge fixation line and the at least first inner fixation line, provided with a non-inflatable connectable element.

The disclosed subject matter further relates to an inflatable structure assembly comprising an inflatable structure as described herein and a detachably attachable counterpart element.

Moreover, the disclosed subject matter relates to an inflatable trampoline arrangement comprising an inflatable structure assembly as described herein.

Furthermore, the disclosed subject matter relates to a method for manufacturing an inflatable structure with a connectable element. The inflatable structure is transformable between a deflated state and an inflated state. The inflatable structure comprises a drop stitch fabric having a first layer and a second layer tethered by drop stitches. The method provides, along at least a portion of an edge of the drop stitch fabric, the inflatable structure with an edge fixation line and an at least first inner fixation line at an at least first margin from the edge, the edge fixation line and the at least first inner fixation line comprising coupling means fixating the first layer to the second layer. The method further provides, between the edge fixation line and the at least first inner fixation line, the inflatable structure with a non-inflatable connectable element.

Thereby, there is introduced an approach according to which said inflatable structure is provided with a connectable element.

That is, since the inflatable structure comprises a drop stitch fabric having a first layer and a second layer tethered by drop stitches, the inflatable structure has the potential to in an inflated state be transformed into a strong, firm structure. That is to say, the drop stitches may in the inflated state hold the inflatable structure firmly in shape, thus allowing the inflatable structure to maintain its shape and stability under heavy outside pressure and impact.

Moreover, that is, since the inflatable structure, along at least a portion of an edge of the drop stitch fabric, is provided with an edge fixation line comprising coupling means fixating the first layer to the second layer, in addition to the drop stitches tethering the first layer to the second layer, coupling means of the edge fixation line additionally couple the first layer to the second layer along the edge fixation line. As a result thereof, at least a portion of a perimeter of said structure may thereby be formed and bonded.

Moreover, that is, since the inflatable structure, along at least a portion of the edge of the drop stitch fabric, is provided with an at least first inner fixation line at an at least first margin from the edge, which at least first inner fixation line comprises coupling means fixating the first layer to the second layer, also the coupling means of the at least first inner fixation line additionally couple the first layer to the second layer.

Furthermore, that is, since the inflatable structure, between the edge fixation line and the at least first inner fixation line, is provided with a non-inflatable connectable element, e.g. adapted to be connectable with a detachably attachable counterpart element, the connectable element is fixated and/or at least partly enclosed between the edge fixation line and the at least first inner fixation line. As a result thereof, the inflatable structure comprises an element which is integrated with the inflatable structure, which element is adapted to e.g. be detachably mated with, connected to and/or mounted with an unintegrated matching element, e.g. a rigid structure. Accordingly, the inflatable structure may thereby—via the connectable element—be detachably connectable with external elements matable with said connectable element, i.e. counterpart elements may—e.g. repeatedly—be mated with and removed from the inflatable structure. Thus, with the introduced approach, the inflatable structure may thereby in an efficient manner be connected to other external elements. Moreover, due to that the inflatable structure in the inflated state as compared to the deflated state expands in thickness in the direction of the drop stitches, i.e. to the drop stitch length, and as a result thereof shrinks in a plane perpendicular thereto, i.e. surface area-wise, the edge along which the connectable element is provided, is due to the contraction force pulled inward toward a centre of the inflatable structure, subsequently efficiently tightening a potential counterpart element connected to the connectable element against the inflatable product, e.g. in that portions of the inflatable structure near the edge in the inflated state then may come into contact with and/or be squeezed between portions of the counterpart element facing the connectable element 7. Accordingly, with the introduced approach, a strong, stiff and tight connection between the inflatable structure—via the connectable element—and the potential counterpart element, may be supported. Thus, balancing dimensions of the fixation lines affects to what extent the connectable element—and subsequently a potential counterpart element—in the inflated state is pulled inwards, and consequently, by balancing said dimensions as deemed adequate, said contraction extent may be controlled.

The technical features and corresponding advantages will be discussed in further detail in the following.

BRIEF DESCRIPTION OF THE DRAWINGS

The various aspects of the non-limiting embodiments, including particular features and advantages, will be readily understood from the following detailed description and the accompanying drawings, in which.

DETAILED DESCRIPTION

Figure 1A:
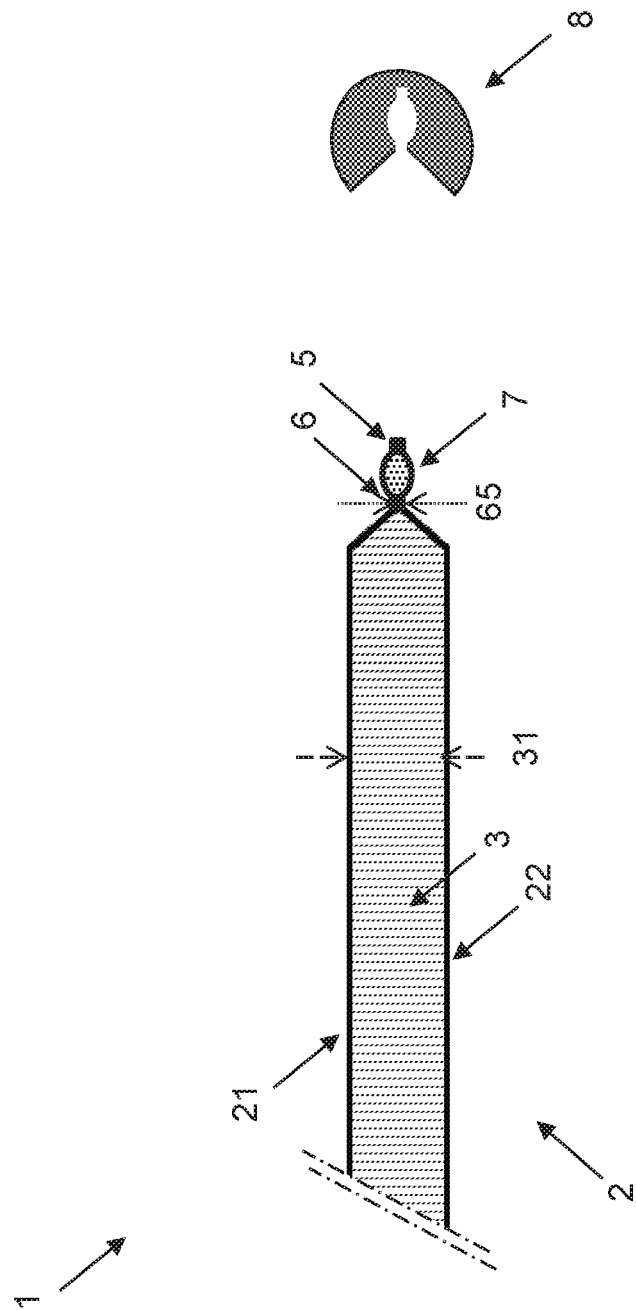
FIGS. 1A and 1B illustrate schematic views of a portion of an exemplifying inflatable structure in an inflated state according to embodiments of the disclosure.

Non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to an inflatable structure transformable at least between a deflated state and an inflated state, there will be disclosed an approach according to which said inflatable structure is provided with a connectable element.

Figure 1B:
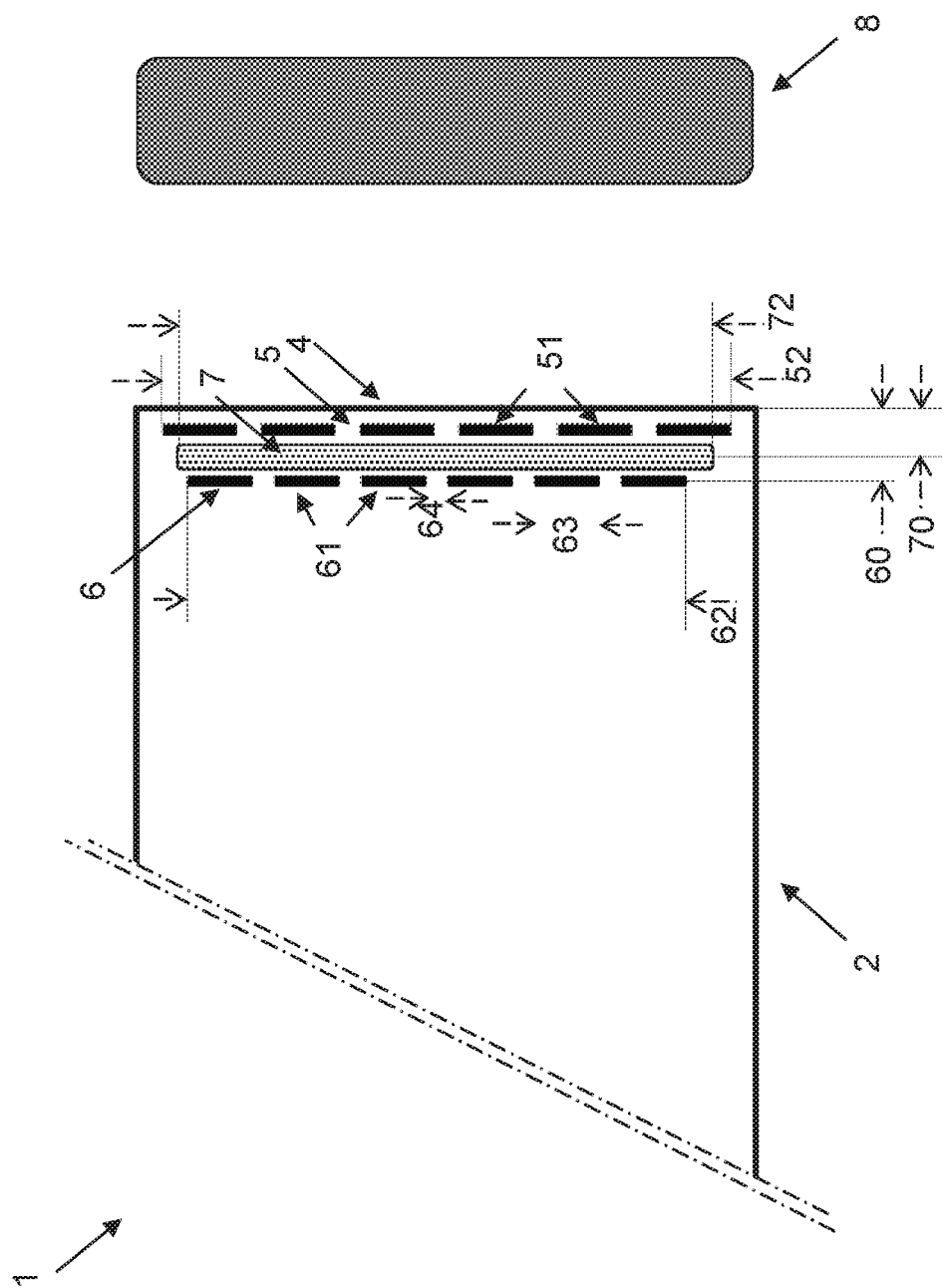

Referring now to the figures and FIG. 1 in particular, there are depicted schematic views of a portion of an exemplifying inflatable structure 1 in an inflated state according to embodiments of the disclosure. FIG. 1a illustrates a side view of the inflatable structure 1 and FIG. 1b a top view thereof 1. The inflatable structure 1 may be represented by any inflatable product and/or article deemed feasible and/or applicable for the introduced approach. The expression "inflatable" may refer to "pressurizable", whereas "structure" may refer to "arrangement", "article", "product" and/or "body".

The inflatable structure 1 is transformable between a deflated state and an inflated state, the latter exemplified in FIG. 1a. The deflated state may refer to a condition of the inflatable structure 1 in which the inflatable structure 1 is not pressurized, and may for instance be desirable for storage and/or transportation of the inflatable structure 1. Correspondingly, the inflated state may refer to a condition of the inflatable structure 1 in which the inflatable structure 1 is pressurized—e.g. at least up to a predetermined and/or predeterminable value, pressure and/or percentage of e.g. a maximum potential pressure to which the inflatable structure 1 may be inflated—and which state further may be referred to as a state for intended use of the inflatable structure 1. The expression "inflatable structure transformable" between a deflated and an inflated state, may refer to "inflatable structure adapted to transition and/or change" between a deflated and an inflated state. "Deflated" state, on the other hand, may refer to "unpressurized" state and/or "storage and/or transportation" state, whereas "inflated" state may refer to "pressurized" state and/or "usage and/or intended use" state. The expression "state" may refer to "condition" and/or "mode".

The inflatable structure 1 comprises a drop stitch fabric 2 having a first layer 21 and a second layer 22 tethered by drop stitches 3. Thereby, the inflatable structure 1 has the potential to in an inflated state be transformed into a strong, firm structure. That is, the drop stitches 3 may in the inflated state hold the inflatable structure 1 firmly in shape, thus allowing the inflatable structure 1 to maintain its shape and stability under heavy outside pressure and impact.

The drop stitch fabric 2 may refer to any drop stitch fabric commonly known in the art, and be of any dimensions—e.g. width and/or length—deemed suitable for the inflatable structure 1 at hand, e.g. range from tens of millimetres up to tens of metres. In a similar manner, the first layer 21 and the second layer 22 may refer to any drop stitch layers commonly known, and be of any thickness deemed suitable for the inflatable structure 1 at hand, e.g. range from tenths of millimetres up to several millimetres, and/or comprise any material commonly known, such as for instance nylon and/or polyester. Moreover, the first layer 21 and/or the second layer 22 may each be represented by a respective set of layers lying on top of another in a known manner, which layers may or may not comprise different materials. Yet again, in a similar manner, the drop stitches 3 may be represented by any drop stitches known in the art, e.g. be represented by fibers, strands and/or threads e.g. comprising polyester material and moreover e.g. be provided in a linear, zigzag and/or random pattern. The drop stitches 3 may further be of any dimensions and/or characteristics deemed suitable for the inflatable structure 1 at hand, and for instance may a length of the drop stitches 3, i.e. a drop stitches length 31, range from a few millimetres up to hundreds of millimetres. Although in the Figures the drop stitches 3 in vicinity of the at least second fixation line 6 (described further on) are illustrated as shorter, it may be noted that the length 31 of the drop stitches 3 may be constant across the drop stitch fabric 2. The drop stitches 3 may in a commonly known manner extend through the first layer 21 and the second layer 22, and further—should the first 21 and/or the second 22 layer be represented by a respective set of layer—then the drop stitches 3 may extend through one, a few or all of the layers in the respective set. The drop stitch fabric 2, the first layer 21, the second layer 22 and the drop stitches 3 may further be provided and/or manufactured, and/or have been manufactured, in any commonly known manner, with support from e.g. a weaving, sewing, stitching and/or loom machine and/or system.

The expression "drop stitch fabric" may refer to "uniform, integral and/or undivided drop stitch fabric", "drop stitch fabric with a uniform extension area" and/or "two-layer fabric", whereas "fabric" may refer to "material" and/or "cloth". The expression "layer", on the other hand, may refer to "set of parallel layers and/or "essentially and/or at least partly parallel layers", whereas "tethered" by drop stitches may refer to "tethered by a dense array" of drop stitches and further to "coupled", "joined" and/or "held" by drop stitches. "Drop stitches" may refer to "spacer threads" and/or "vertical stitches", and further to "drop stitches there between".

The inflatable structure 1 and/or the drop stitch fabric 2—or portions thereof—may optionally be coated and/or sealed. Thereby, the inflatable structure 1 may be made airtight and/or gas proof, i.e. the inflatable structure 1 may—following upon inflation thereof 1—be able to remain in the inflated state without air seeping out. Coating and/or sealing may be provided in any manner—e.g. known in the art—enabling the inflatable structure 1 to be airtight, and for instance be represented by one or more commonly known layers of coating, e.g. PVC, urethane and/or Hypalon, and/or commonly known patches. The expression "the inflatable structure and/or the drop stitch fabric" may be coated and/or sealed may refer to "the first and the second layers of the inflatable structure and/or the drop stitch fabric" may be coated and/or sealed, whereas "coated" may refer to "provided with coating" and/or "provided with one or more coating layers". "Sealed", on the other hand, may refer to "one or more edges and/or folding lines thereof sealed". According to an example, the phrase "coated and/or sealed" may refer to "coated and/or sealed, such that the inflatable structure is airtight".

The inflatable structure 1 is, along at least a portion of an edge 4 of the drop stitch fabric 2, provided with an edge fixation line 5 comprising coupling means 51 fixating the first layer 21 to the second layer 22. Thereby, in addition to the drop stitches 3 tethering the first layer 21 to the second layer 22, coupling means 51 of the edge fixation line 5 additionally couple the first layer 21 to the second layer 22 along the edge fixation line 5. As a result thereof, at least a portion of a perimeter 4 of said structure 1 may thereby be formed and bonded.

Moreover, the inflatable structure 1 is, along at least a portion of the edge 4 of the drop stitch fabric 2, provided with an at least first inner fixation line 6 at an at least first margin 60 from the edge 4, the at least first inner fixation line 6 comprising coupling means 61 fixating the first layer 21 to the second layer 22. Thereby, also the coupling means 61 of the at least first inner fixation line 6 additionally couple the first layer 21 to the second layer 22.

Figure 2:
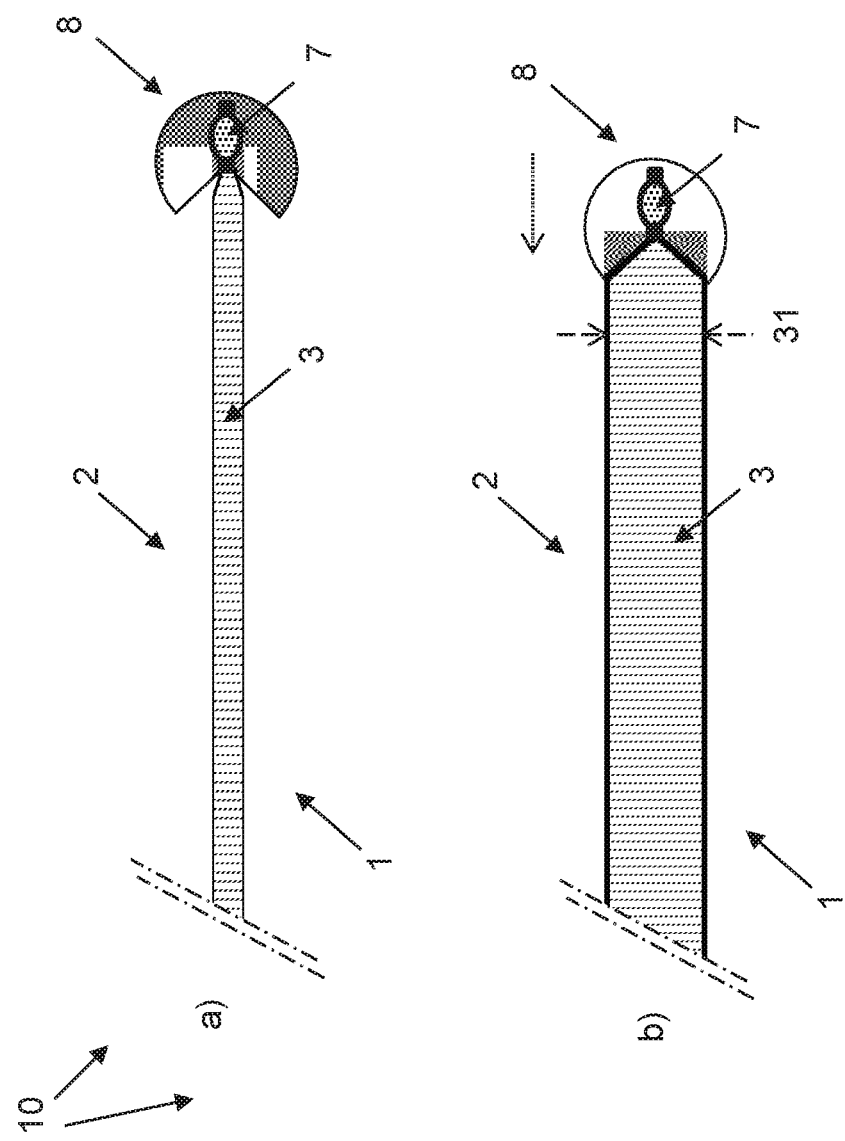
FIG. 2 illustrates schematic side views of a portion of an exemplifying inflatable structure assembly in a respective deflated and inflated state according to embodiments of the disclosure.

Moreover, the inflatable structure 1 is, between the edge fixation line 5 and the at least first inner fixation line 6, provided with a non-inflatable connectable element 7, e.g. adapted to be connectable with a detachably attachable counterpart element 8. Thereby, the connectable element 7 is fixated and/or at least partly enclosed between the edge fixation line 5 and the at least first inner fixation line 6. As a result thereof, the inflatable structure 1 comprises an element 7 which is integrated with the inflatable structure 1, which element 7 is adapted to be e.g. detachably mated with, connected to and/or mounted with an unintegrated matching element 8, e.g. a rigid structure. Accordingly, the inflatable structure 1 is thereby—via the connectable element 7—detachably connectable with external elements 8 matable with said connectable element 7, i.e. counterpart elements 8 may—e.g. repeatedly—be mated with and removed from the inflatable structure 1. Thus, with the introduced approach, the inflatable structure 1 may thereby in an efficient manner be connected to other external elements 8. Moreover—and as demonstrated in FIG. 2 which depicts schematic side views of a portion of an exemplifying inflatable structure assembly 10 in a respective deflated state (FIG. 2a) and inflated state (FIG. 2b) according to embodiments of the disclosure—since the inflatable structure 1 the inflated state (FIG. 2b) as compared to the deflated state (FIG. 2a) expands in thickness in the direction of the drop stitches 3, i.e. to the drop stitch length 31, and as a result thereof shrinks in a plane perpendicular thereto, i.e. surface area-wise, the edge 4 along which the connectable element 7 is provided, is due to the contraction force pulled inward toward a centre of the inflatable structure 1, subsequently efficiently tightening a potential counterpart element 8 connected to the connectable element 7 against the inflatable product 1, e.g. in that portions of the inflatable structure 1 near the edge 4 in the inflated state then may come into contact with and/or be squeezed between portions of the counterpart element 8 facing the connectable element 7. Accordingly, with the introduced approach, a strong, stiff and tight connection between the inflatable structure 1—via the connectable element 7—and a potential counterpart element 8, may be supported. Thus, balancing dimensions of the fixation lines 5, 6 affects to what extent the connectable element 7—and subsequently the potential counterpart element 8—in the inflated state is pulled inwards, and consequently, by balancing said dimensions as deemed adequate, said contraction extent may be controlled.

Since the inflatable structure 1 and a potential external counterpart element 8 may be connected with one another and subsequently form a desired construction, structure and/or arrangement in the use state—i.e. the inflated state—the introduced approach additionally relates to an inflatable structure assembly 10 comprising the connectable element 7 and the detachably attachable counterpart element 8. The inflatable structure assembly 10 may be represented by any inflatable product and/or article deemed feasible and/or applicable for the introduced approach. According to an example, the inflatable structure assembly 10 may be represented by an inflatable structure assembly 10 adapted to—in the inflated state—be utilized as an inflatable separation wall and/or shelf, e.g. in a luggage compartment of a vehicle.

As shown in FIG. 1b, the edge fixation line 5 may run—continuously and/or intermittently—along the entire edge and/or contour 4 of the inflatable structure 1, or along one or more portions thereof 4. Additionally or alternatively, the edge fixation line 5 may, as shown in FIG. 1b, slightly deviate from the edge 4, for instance with an any offset margin deemed suitable for the inflatable structure 1 at hand, e.g. ranging from close to zero millimetres up to tens of millimetres. The edge fixation line 5 may accordingly be a combination of straight and curved lines, with corners and/or angles as defined by the shape and/or geometry of the inflatable structure 1.

The at least first inner fixation lines 6, on the other hand, may respectively be of any form and/or design deemed suitable for the inflatable structure 1 at hand, to at least partly enclose the connectable element 7 between the edge fixation line 5 and the at least first inner fixation line 6, and/or to control to what extent the connectable element 7 is pulled inwards in the inflated state. The one or more inner fixation lines 6 may run—continuously and/or intermittently—along at least a portion of the edge 4, at a distance 60 therefrom, and for instance be straight and/or comprise one or a combination of straight and curved lines, e.g. with corners and/or angles. The at least first margin 60 defines at what distance or distances from the edge 4 the at least first inner fixation line 6 is located. The at least first margin 60 may be selected as deemed suitable for the inflatable structure 1 at hand, for instance range from a few millimetres up to hundreds of millimetres, and may further vary along the first inner extension line 6 and/or edge 4. Furthermore, the at least first inner fixation line 6 may comprise more than one inner fixation line, and subsequently, the at least first margin 60 may refer to more than one margin. The plural fixation lines 6, and subsequently the plural margins 60, may be disposed and/or located in relation to one another as deemed suitable for the inflatable structure 1 at hand, e.g. to render desired effects in the inflated state, such as to what extent the connectable element 7—and subsequently the potential counterpart element 8—in the inflated state is pulled inwards towards the inflatable structure 1.

The coupling means 51, 61 may be represented by any coupling members enabling the first layer 21 to be coupled, attached and/or fixated to the second layer 22 along the edge fixation line 5 and the at least first inner fixation line 6. Dimensions of the fixation lines 5, 6 and/or coupling means 51, 61 may be selected in any manner deemed suitable for the inflatable structure 1 at hand, to at least partly enclose the connectable element 7 between the edge fixation line 5 and the at least first inner fixation line 6, and/or to control to what extent the connectable element 7 is pulled inwards in the inflated state. The dimensions may for instance relate to magnitudes of the fixation lines 5, 6, such as, as shown in FIG. 1b, to what extent 52, 62 respective fixation line 5, 6 extends, to what extent 63 a coupling means 61 extends, a separation distance 64 between two adjacent coupling means 61, and/or, as shown in FIG. 1a, a potential gap and/or length 65—e.g. in the inflated state—between the first layer 21 and the second layer 22 along respective folding line 4. Dimensions and/or characteristics of respective edge fixation line 5 and the one or more inner fixation lines 6 may differ from one another, and subsequently, so may dimensions and/or characteristics of the respective coupling means 51, 61 comprised therein 5, 6. The fixation lines 5, 6 may be provided—and/or have been provided—in any manner deemed suitable for the inflatable structure 1 at hand, e.g. with support from a—potentially known—fixation line providing machine and/or system, and/or potentially by hand.

Optionally, the edge fixation line 5 and/or the at least first inner fixation line 6 may comprise a seam, and the respective coupling means thereof stitches. The coupling stitches may be represented by any stitches enabling the first layer 21 to be coupled, attached, fixated and/or tethered to the second layer 22 along the corresponding fixation line(s) 5, 6, i.e. seam(s). The seam(s) may be provided—and/or have been provided—in any manner deemed suitable for the inflatable structure 1 at hand, e.g. with support from a sewing machine and/or system, and/or potentially by hand. The expression "seam" may refer to "sewing line", whereas "stitches" may refer to "coupling stitches".

According to an example, one or more of the fixation lines 5, 6 may, additionally or alternatively, be represented by and/or comprise welding lines. The coupling means 51, 61 may then comprise and/or be represented by welds and/or weld spots. In a similar manner, according to another example, one or more of the fixation lines 5, 6 may, additionally or alternatively, be represented by and/or comprise one or more lines with drop stitches of reduced length. The coupling means 51, 61 may then comprise and/or be represented by drop stitches of reduced length.

The non-inflatable connectable element 7 may be represented by any component adapted to be matable with a counterpart element 8 deemed suitable for the inflatable structure 1 at hand. The connectable element 7 may accordingly be of any feasible form, material and/or dimensions, for instance positioned a predeterminable distance and/or margin 70 from the edge 4. Correspondingly, a potential detachably attachable counterpart element 8 may be represented by any component—e.g. known—adapted to be matable with the integrated connectable element 7. The attachable counterpart element 8 may accordingly, in a similar manner, be of any feasible form, material and/or dimensions.

The connectable element 7 may be provided—and/or have been provided—in any manner deemed suitable for the inflatable structure 1 at hand, e.g. with support from a—potentially known—element providing machine and/or system, and/or potentially by hand. Moreover, optionally, at least a portion of the connectable element 7 may be provided between the first layer 21 and the second layer 22. Furthermore, optionally, the edge fixation line 5 and/or the at least first inner fixation line 6 may be provided intermediate an uncoated drop stich fabric 2 and one or more coating layers. Thereby, one or more of the fixation lines 5, 6 may be provided—and/or have been provided—prior to coating of the drop stich fabric 2. Accordingly, the first layer 21 and the second layer 22 has in this case been bonded along one or more of the fixation lines 5, 6 prior to the drop stitch fabric 2 being coated, and accordingly, the fixation lines 5, 6 may be coated together with the coating of the drop stitch fabric 2. The expression "intermediate" may refer to "between".

The expression "the inflatable structure" is provided with an edge fixation line may refer to "the drop stitch fabric of the inflatable structure" is provided with an edge fixation line, whereas "is provided with" an edge fixation line may refer to "comprises" and/or "having provided thereon" an edge fixation line. "Along at least a portion of" an edge, on the other hand, may refer to "along at least a segment of" an edge and/or merely "along" an edge. The expression "edge" may refer to "contour" and/or "perimeter", whereas "an edge of the drop stich fabric" may refer to "an edge of the inflatable structure". An "edge fixation line", on the other hand, may refer to a "contour fixation line", a "sealing fixation line" and/or an "edge coupling and/or bonding line", whereas "inner fixation line" may refer to "elongated inner fixation line", "adapted fixation line" and/or "inner coupling and/or bonding line". Moreover, fixation "line" may refer to fixation "extension" and/or fixation "strip". "An at least first inner fixation line" may refer to "at least one first inner fixation line". The expression "at" an at least first margin from the edge may refer to "located at" an at least first margin from the edge, whereas "margin" may refer to "margin inwards, "distance" and/or "offset margin". "First margin from the edge" may refer to "first margin from the edge as seen from a top view" and/or "first lateral margin from the edge". Comprising "coupling means", on the other hand, may refer to comprising "respective coupling means", whereas coupling means "fixating" may refer to coupling means "respectively fixating". The expression "fixating" the first layer to the second layer may refer to "attaching", "bonding" and/or "coupling" the first layer to the second layer, "coupling narrower and/or tighter than the drop stitches" the first layer to the second layer, and/or "tethering and/or tethering in an alternative manner" the first layer to the second layer. "Coupling means" may refer to "coupling members", "couplings" and/or "couplers". According to an example, "fixation lines" may further refer to one or more "seams, welding lines and/or lines with drop stitches of reduced drop stitches length", and subsequently, the "coupling means" may then optionally refer to "welds, welding spots and/or stitches". The expression "the inflatable structure" is provided with a non-inflatable connectable element may refer to "the drop stitch fabric of the inflatable structure" is provided with a non-inflatable connectable element, whereas "is provided with" a non-inflatable connectable element may refer to "comprises" a non-inflatable connectable element. "Between" the edge fixation line and the at least first inner fixation line, on the other hand, may refer to "located and/or disposed between" and/or "somewhere between" the edge fixation line and the at least first inner fixation line, whereas "non-inflatable connectable element" may refer to merely "element". Moreover, "element" may refer to "component, part, object, profile and/or article", and further to "connectable", "connecting", "matable", "mating" and/or "mounting" element, whereas "connectable with" may refer to "matable with". The expression non-inflatable connectable "element adapted to be connectable with" may refer to non-inflatable connectable element "adapted to support to be connectable with" and/or non-inflatable connectable element "supporting to be connectable with", or merely to non-inflatable connectable "element connectable with". A detachably "attachable" counterpart element, on the other hand, may refer to a detachably "connectable" counterpart element, whereas "counterpart" element may refer to "matching", "mating", "cooperating" and/or "connecting" element. Moreover, counterpart "element" may refer to counterpart "component, part, object and/or article".

Optionally, the edge fixation line 5, the at least first inner fixation line 6 and/or the at least first margin 60 may be adapted to render the connectable element 7 to in the deflated state be attachable and detachable with the counterpart element 8 and in the inflated state to be un-detachable from the counterpart element 1. Thereby, the potential counterpart element 8 may in the deflated state be mated with—and/or removed from—the connectable element 7. Moreover, a robust connection in the inflated state between the inflatable structure 1—via the connectable element 7—and a potential counterpart element 8, is supported, in that the connectable element 7 in the inflated state from balancing dimensions of the edge fixation line 5, the at least first inner fixation line 6 and/or the at least first margin 60, is adapted to be locked with the potential counterpart element 8. The expression "the edge fixation line, the at least first inner fixation line and/or the at least first margin is adapted" may refer to "dimensions of the edge fixation line, the at least first inner fixation line and/or the at least first margin are adapted", whereas "is adapted to" in this context may refer to "is balanced". The expression "render" the connectable element, on the other hand, may refer to "enable", "result in that" the connectable element. Moreover, the expression "attachable" with the counterpart element may refer to "connectable" and/or "able to connect with the counterpart element", whereas "lockable" with the counterpart element may refer to "attached", "connected", "non-detachable", "fixated" and/or "locked" with the counterpart element.

Optionally, additionally or alternatively, the connectable element 7 may have an elongated form extending a predeterminable extent 72 along at least a portion of the edge fixation line 5. Thereby, the connectable element 7 may be adapted to be connectable with an external counterpart element 8 along an elongated portion 72 deemed sufficient. The expression "elongated" form may refer to "extended" form, whereas "form" may refer to "shape" and/or "geometry". "Extending", on the other hand, may refer to "extending continuously and/or intermittently", whereas "predeterminable extent" may refer to "predetermined extent" and/or merely "extent". Moreover, "extent" may refer to "extension", "spread" and/or "magnitude", whereas along at least a "portion" may refer to along at least a "segment". The expression portion "of the edge fixation line", on the other hand, may refer to portion "of the edge fixation line and/or at least first fixation line".

Further optionally, the connectable element 7 may comprise a rope, tube and/or hose. Thereby, a connectable element 7 of an elongated form, is provided, which efficiently may connect—e.g. be slidable—into e.g. a groove, slot, channel and/or slit of a potential counterpart element 8, such as e.g. a profile section 8. Dimensions of respective rope, tube and/or hose may be selected as deemed suitable for the inflatable structure 1 at hand, and an extent may accordingly range from e.g. a few tens of millimetres up to hundreds or even thousands of millimetres, and a diameter e.g. from a few millimetres up to tens of millimetres. "Comprising" a rope, tube and/or hose, on the other hand, may refer to "is represented by a rope, tube and/or hose.

Moreover, according to an example, the connectable element 7 may comprise a inflation port having a hollow portion protruding from the inflatable structure 1 formed to be connectable with an inflation source, and further having a portion, such as a tube and/or hose, which portion along at least a segment thereof facing the inflatable structure 2, is at least partly perforated. Thereby, an integrated, robust and/or low cost inflation port is introduced, which may be connectable to an inflation source and/or to another inflatable structure 1 provided with a similar inflation port, in a series-coupled manner.

Optionally, at least a portion of the connectable element 7 may have a form slidable into—and/or comprising—a groove, slot, channel and/or slit. Thereby, the connectable element 7 integrated with the inflatable structure 1 may be adapted to be connectable with an external counterpart element 8 in an efficient manner, by enabling sliding of the connectable element 7 into a groove, slot, channel and/or slit of the counterpart element 8 such as e.g. a profile section 8, and/or vice versa, by enabling a counterpart element 8 to be slidable into a groove, slot, channel and/or slit of the connectable element 7. Dimensions of respective groove, slot, channel and/or slit may be selected as deemed suitable for the inflatable structure 1 at hand, and may accordingly range from a few millimetres up to hundreds or even thousands of millimetres. The expression "has a form" may refer to "is adapted to have a form", whereas "form" may refer to "shape" and/or "geometry". "Comprising" a groove, slot, channel and/or slit, on the other hand, may refer to "adapted to comprise" a groove, slot, channel and/or slit.

According to an example, the introduced approach may further relate to a method for connecting a detachably attachable element 7 to a non-inflatable connectable element 7 of an inflatable structure 1 in a deflated state of the inflatable structure 1, the inflatable structure 1 being transformable between the deflated state and an inflated state, the inflatable structure 1 comprising a drop stitch fabric 2 having a first layer 21 and a second layer 22 tethered by drop stitches 3, the inflatable structure 1 being provided with, along at least a portion of an edge 4 of the drop stitch fabric 2, an edge fixation line 5 and an at least first inner fixation line 6 at an at least first margin 60 from the edge 4, the edge fixation line 5 and the at least first inner fixation line 6 comprising coupling means 51, 61 fixating the first layer 21 to the second layer 22, wherein the inflatable structure 1 is provided with, between the edge fixation line 5 and the at least first inner fixation line 6, the non-inflatable connectable element 7, which connectable element 7 is adapted to be connectable with a detachably attachable counterpart element 8, the method comprising sliding the connectable element 7 into the counterpart element 8, e.g. a groove, slot, channel and/or slit thereof 8, and/or sliding the counterpart element 8 into the connectable element 7, e.g. a groove, slot, channel and/or slit thereof 7.

Optionally, a counterpart element 8 may comprise a rigid structure, profile and/or frame. Thereby, a robust counterpart element 8 may be provided, thus enabling for the inflatable structure assembly 10 to, in the inflated state, by means of the inflatable structure 1 connected with the counterpart element 8, form a rigid and or stiff construction. The structure, profile and/or frame may refer to any known structures, profiles and/or frames, comprising any material. According to an example, the structure, profile and/or frame may comprise at least one of e.g. aluminium, steel, and/or plastic.

Figure 3:
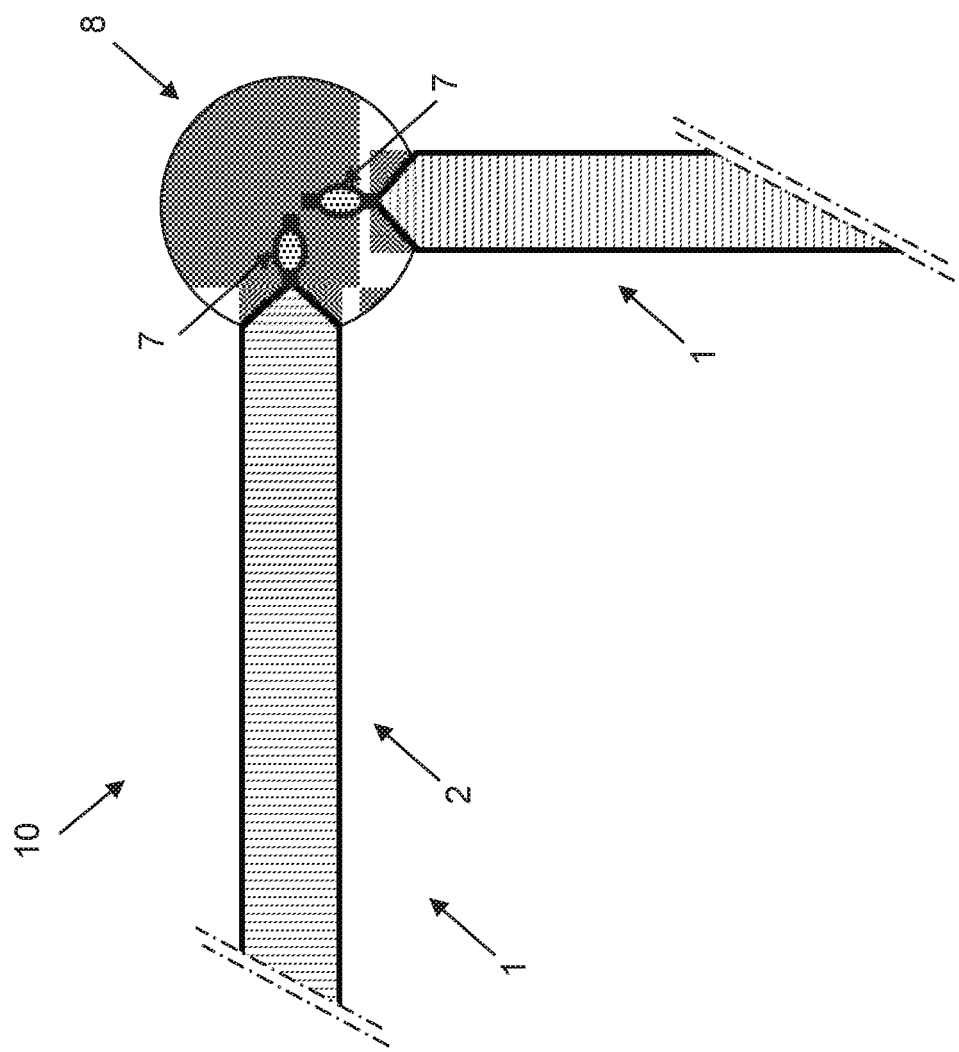
FIG. 3 illustrates a schematic side view of a portion of an exemplifying inflatable structure assembly according to embodiments of the disclosure.

Further optionally, additionally or alternatively, and as demonstrated in FIG. 3 which depicts a schematic side view of a portion of an exemplifying inflatable structure assembly 10 according to embodiments of the disclosure, the counterpart element 8 may be additionally detachably attachable with one or more other inflatable structures 1 similarly comprising a connectable element 7 as described herein. Accordingly, the inflatable structure assembly 10 may optionally additionally comprise at least a second inflatable structure 1. The exemplifying counterpart element 8 may for instance comprise a structure, profile and/or frame, and/or be represented by a profile section, comprising duplicate or plural grooves, slots, channels and/or slits for respective inflatable structure 1.

Figure 4A:
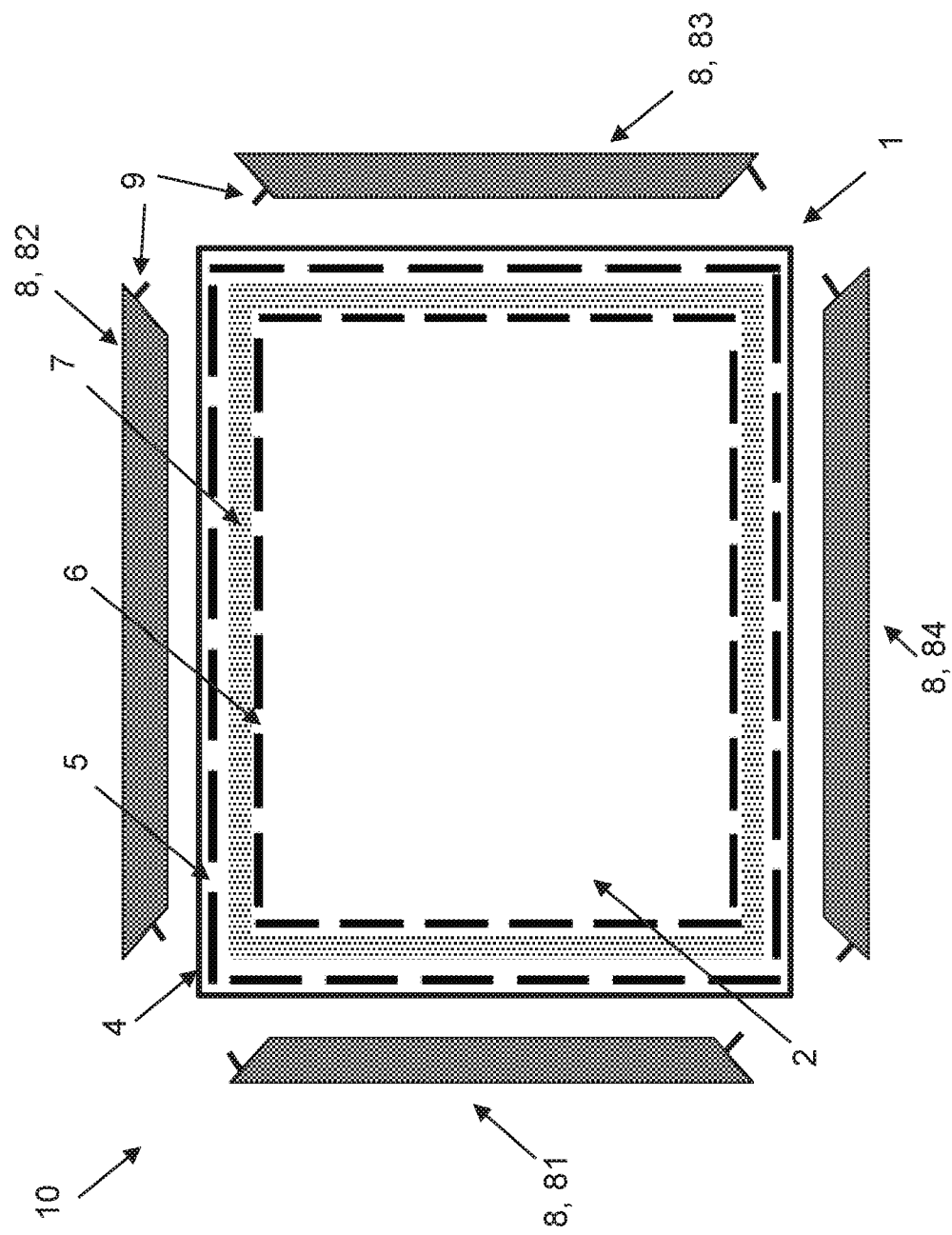
FIGS. 4A and 4B illustrate schematic top views of an exemplifying inflatable structure assembly in a respective deflated and inflated state according to embodiments of the disclosure.
Figure 4B:
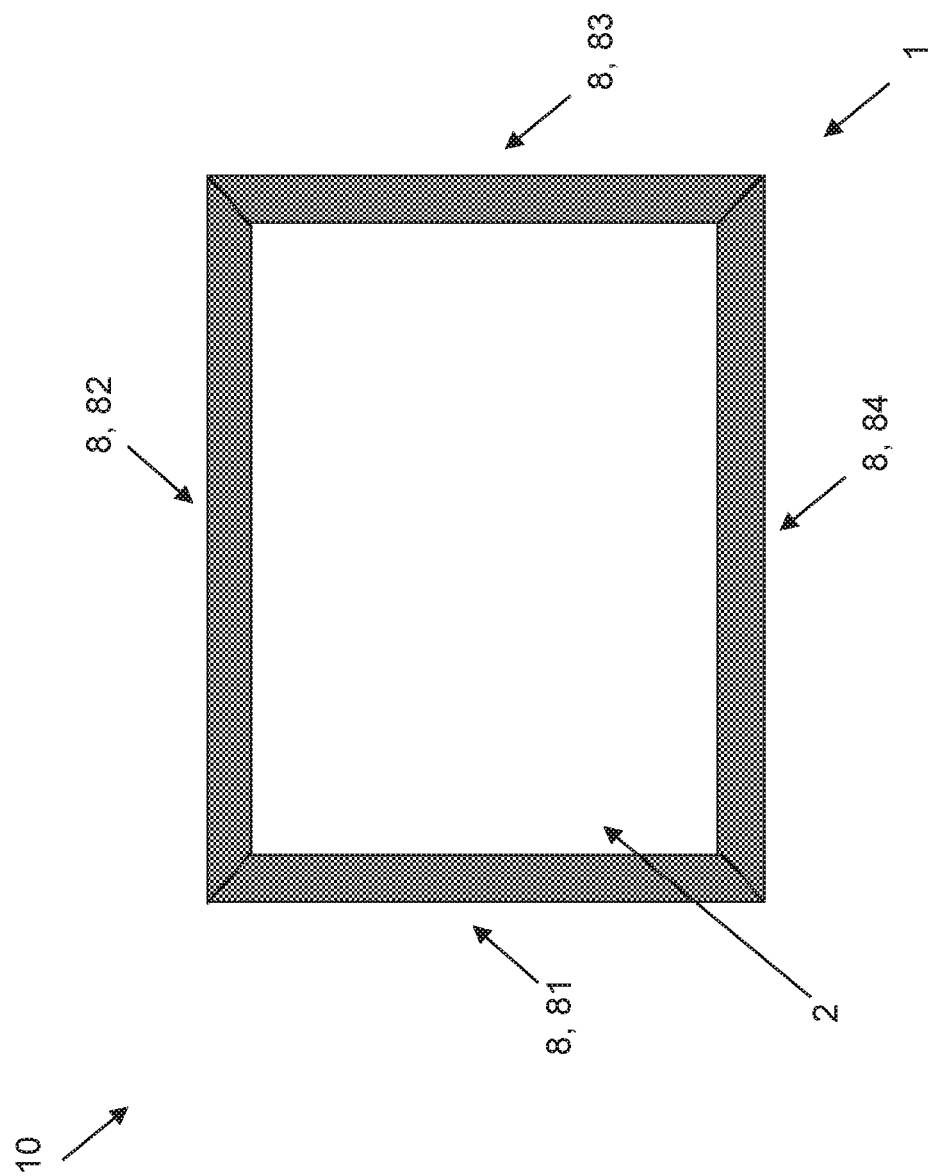

Optionally, and as demonstrated in FIG. 4 which depicts schematic top views of an exemplifying inflatable structure assembly 10 in a respective deflated state (FIG. 4a) and inflated state (FIG. 4b) according to embodiments of the disclosure; should the counterpart element 8 comprise an optional rigid structure, profile and/or frame, then the rigid structure, profile and/or frame 8 may comprises two or more sections 81, 82, 83, 84 formed such that, when in connection with the connectable element 7, the one or more sections 81, 82, 83, 84 are uncoupled from one another 81, 82, 83, 84 in the deflated state and coupled with one another 81, 82, 83, 84 in the inflated state.

Thereby, said sections 81, 82, 83, 84 of the counterpart element 8 may then in the inflated state, and as shown in FIG. 4b, be attached to one other 81, 82, 83, 84 in an efficient manner, the sections 81, 82, 83, 84 of the counterpart element 8 forming a rigid structure with support from the inflatable structure 1, thus rendering additional fastening means to secure said sections to one another 81, 82, 83, 84 and/or to the inflatable structure 1, unnecessary. The effect of the sections 81, 82, 83, 84 coming together in the inflated state results from the contraction force in the inflated state pulling the connectable element 7—and subsequently the sections 81, 82, 83, 84 of the counterpart element 8—inwards toward the inflatable structure 1. By balancing the dimensions of the edge fixation line 5, the at least first inner fixation line 6 and/or the at least first margin 60, the extent to which the sections 81, 82, 83, 84 in the inflated state come together, may be controlled.

The two of more sections 81, 82, 83, 84 may have any dimensions deemed suitable for the inflatable structure arrangement 10 at hand, to in connection with the connectable element 7 in the deflated state be uncoupled from—and in the inflated state be coupled with—one another 81, 82, 83, 84. Moreover, dimensions of one section 81, 82, 83, 84 may vary from dimensions of another 81, 82, 83, 84. To be able to couple with one another, one or more of the sections 81, 82, 83, 84, may be provided with any strategically located coupling means 9, for instance one or more plugs and/or corresponding mating holes. Said coupling means 9 may for instance, and as shown in FIG. 4a, enable e.g. a first section 81 to be coupled to a second section 82 and a fourth section 84, and a third section 83 to be coupled to the second section 82 and the fourth section 84. The connectable element 7, on the other hand, may for instance be represented by and/or comprise an exemplifying rope extending continuously and/or intermittently along at least a portion of the edge 4 of the inflatable structure 1. The expression "uncoupled" from one another may refer to "unattached", "unassembled" and/or "disconnected" from one another, whereas "one another" may refer to "each other". "Formed such that", on the other hand, may refer to "renders", "adapted and/or having geometries such that".

Figure 5:
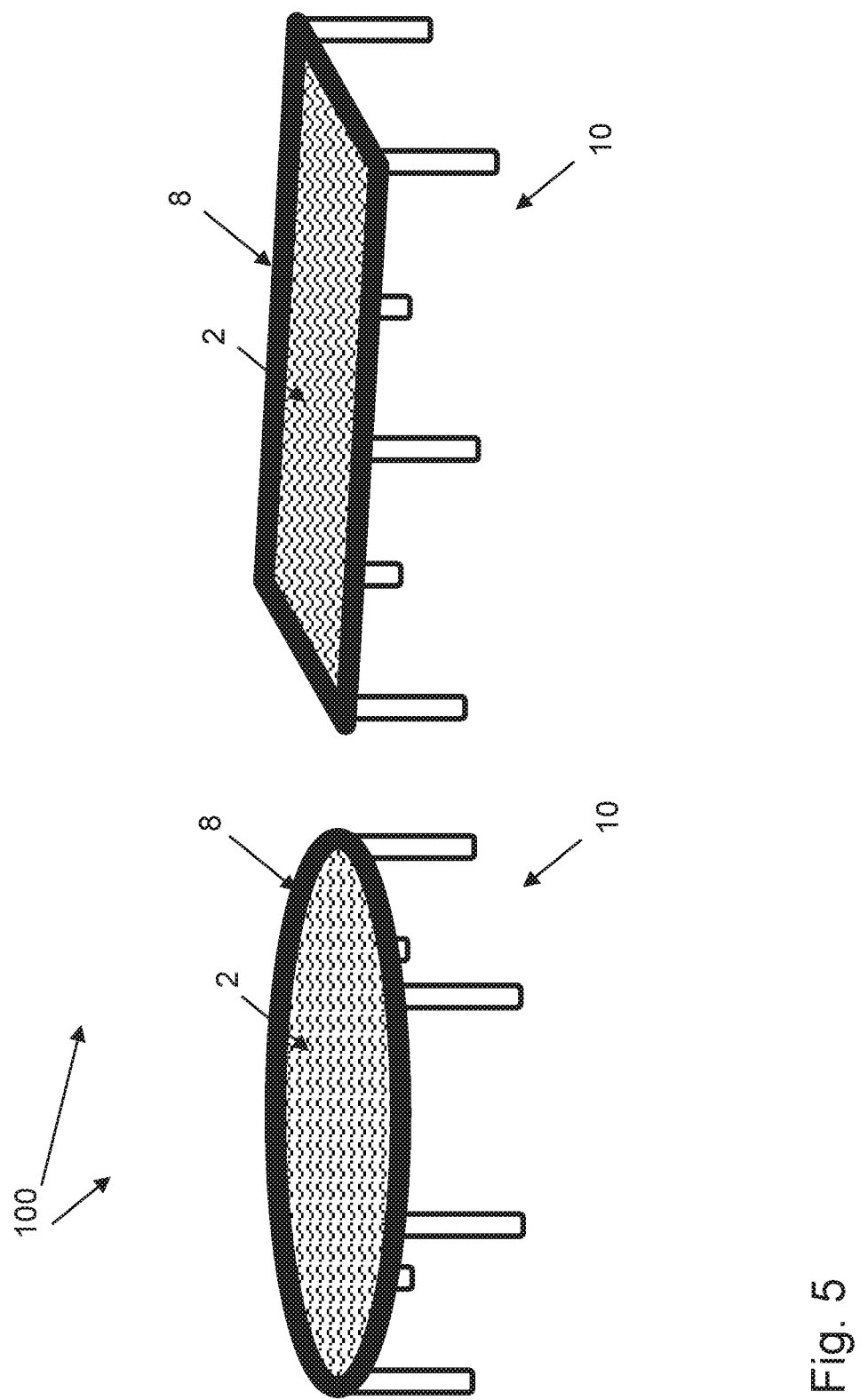
FIG. 5 illustrates exemplifying inflatable trampoline arrangements according to embodiments of the disclosure.

Optionally, and as demonstrated in FIG. 5 which depicts exemplifying inflatable trampoline arrangements 100 according to embodiments of the disclosure, an inflatable trampoline arrangement 100 may comprise an inflatable structure assembly 10 described herein. Thereby, an alternative to traditional trampolines—such as spring loaded trampolines with springs—is introduced, which renders said commonly known springs unnecessary. The spring effect of the inflatable trampoline arrangement 100 is effected by the contraction force and air pressure created in the inflated state of the inflatable structure 1. The dimensions, shape, geometry and/or material of an inflatable trampoline arrangement 100 may be selected as deemed suitable for the inflatable trampoline arrangement 100 at hand. For instance, a surface area of the drop stitch fabric 2 of the inflatable structure 1 comprised in the inflatable trampoline arrangement 100 may e.g. be rectangular, oval and/or circular, and further, the counterpart element 8—which may comprise plural sections—may for instance be represented by and/or comprise at least a portion of a frame, such as a steel frame.

Figure 6:
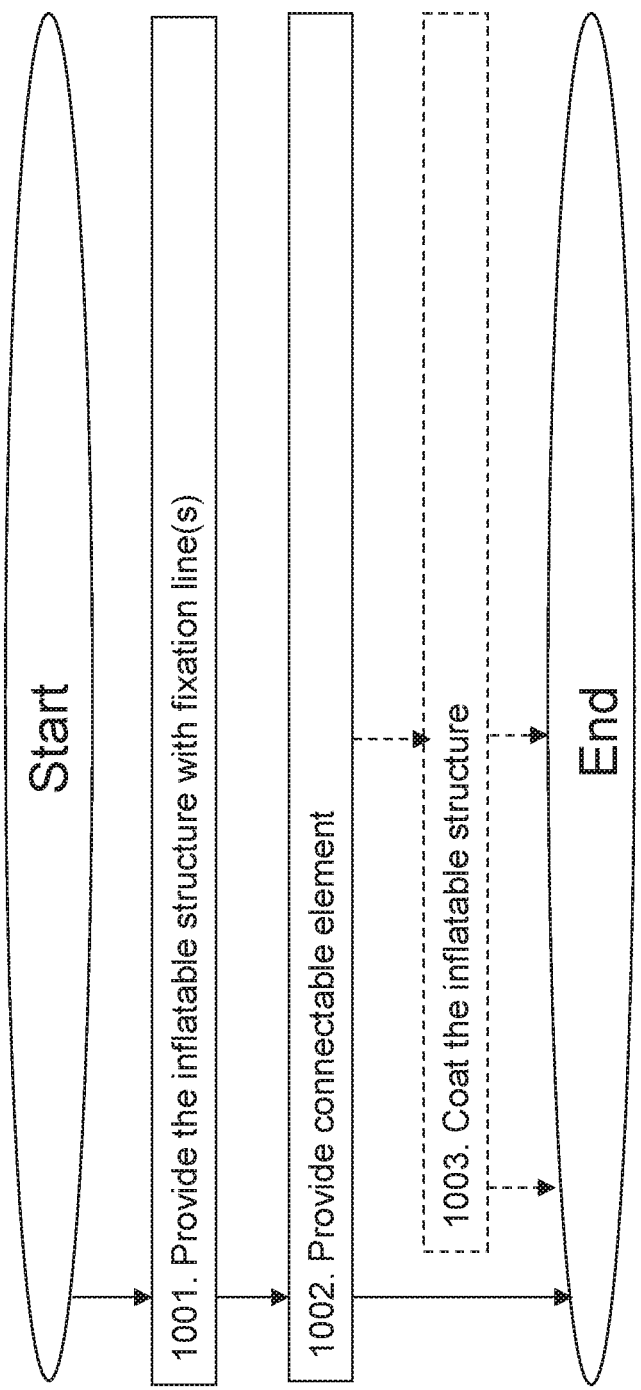
FIG. 6 is a flowchart depicting an exemplifying manufacturing method according to embodiments of the disclosure.

FIG. 6 is a flowchart depicting an exemplifying manufacturing method according to embodiments of the disclosure. Said method is for manufacturing an inflatable structure 1, which inflatable structure 1 is transformable between a deflated state and an inflated state. The inflatable structure 1 comprises a drop stitch fabric 2 having a first layer 21 and a second layer 22 tethered by drop stitches 3. The exemplifying method, which may be continuously repeated, comprises the following action(s) discussed with support from essentially FIG. 1. The actions may be taken in any suitable order, and/or one or more actions may be performed simultaneously; for instance, Action 1001 and Action 1002 may be performed simultaneously and/or in alternate order.

Action 1001: In Action 1001, the inflatable structure 1 is, along at least a portion of an edge 4 of the drop stitch fabric 2, provided with an edge fixation line 5 and an at least first inner fixation line 6 at an at least first margin 60 from the edge 4, the edge fixation line 5 and the at least first inner fixation line 6 comprising coupling means 51, 61 fixating the first layer 21 to the second layer 22.

Action 1002: In Action 1002, the inflatable structure 1 is, between the edge fixation line 5 and the at least first inner fixation line 6, provided with a non-inflatable connectable element 7, which connectable element may be adapted to be connectable with a detachably attachable counterpart element 8.

Action 1003: In optional Action 1003, the inflatable structure 1 may be coated, one or more coating layers covering at least the edge fixation line 5 and/or the at least first inner fixation line 6.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

The invention claimed is:

1. An inflatable structure transformable between a deflated state and an inflated state, the inflatable structure comprising a drop stitch fabric having a first layer and a second layer tethered by drop stitches, the inflatable structure being provided with, along at least a portion of an edge of the drop stitch fabric, an edge fixation line and an at least first inner fixation line at an at least first margin from the edge, the edge fixation line and the at least first inner fixation line comprising coupling means fixating the first layer to the second layer, wherein the inflatable structure is provided with, between the edge fixation line and the at least first inner fixation line, a non-inflatable connectable element.

2. The inflatable structure according to claim 1, wherein the connectable element is adapted to be connectable with a detachably attachable counterpart element.

3. The inflatable structure according to claim 2, wherein the edge fixation line, the at least first inner fixation line and/or the at least first margin is adapted to render the connectable element to in the deflated state be attachable and detachable with the counterpart element and in the inflated state to be un-detachable from the counterpart element.

4. The inflatable structure according to claim 1, wherein the edge fixation line and/or the at least first inner fixation line comprises a seam, and the respective coupling means thereof stitches.

5. The inflatable structure according to claim 1, wherein the edge fixation line and/or the at least first fixation line is provided intermediate an uncoated drop stich fabric and one or more coating layers.

6. The inflatable structure according to claim 1, wherein at least a portion of the connectable element has a form slidable into, and/or comprising, a groove, slot, channel and/or slit.

7. The inflatable structure according claim 1, wherein the connectable element has an elongated form extending a predeterminable extent along at least a portion of the edge fixation line.

8. The inflatable structure according to claim 7, wherein the connectable element comprises a rope, tube and/or hose.

9. An inflatable structure assembly comprising an inflatable structure according to claim 1, and a detachably attachable counterpart element.

10. The inflatable structure assembly according to claim 9, wherein the counterpart element comprises a rigid structure, profile and/or frame.

11. The inflatable structure assembly according to claim 10, wherein the rigid structure, profile and/or frame comprises two or more sections formed such that, when in connection with the connectable element, the one or more sections are uncoupled from one another in the deflated state and coupled with one another in the inflated state.

12. An inflatable trampoline arrangement comprising an inflatable structure assembly according to claim 9.

13. The inflatable structure assembly according to any claim 1, wherein the inflatable structure assembly additionally comprises at least a second inflatable structure.

* * * * *